(12) United States Patent
Wang (10) Patent No.: US 11,004,364 B2
(45) Date of Patent: May 11, 2021

(54) SUPPORTING STRUCTURE FOR FLEXIBLE SCREEN, FLEXIBLE SCREEN STRUCTURE AND TERMINAL DEVICE

(71) Applicant: BEIJING XIAOMI MOBILE SOFTWARE CO., LTD., Beijing (CN)

(72) Inventor: Di Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,108

(22) Filed: Nov. 28, 2019

(65) Prior Publication Data

US 2021/0027666 A1      Jan. 28, 2021

(30) Foreign Application Priority Data

Jul. 24, 2019   (CN) .......................... 201910673328.2

(51) Int. Cl.
  *G09F 9/30* (2006.01)
  *H04M 1/02* (2006.01)
(52) U.S. Cl.
  CPC .......... *G09F 9/301* (2013.01); *H04M 1/0268* (2013.01)
(58) Field of Classification Search
  CPC ............................. G09F 9/301; H04M 1/0268
  USPC ......................................................... 345/174
  See application file for complete search history.

(56) References Cited

U.S. PATENT DOCUMENTS

2016/0282999 A1*   9/2016   Hwang ................... G01L 7/024
2018/0164938 A1    6/2018   Li
2019/0196641 A1*   6/2019   Ryu ....................... G06F 3/0414

FOREIGN PATENT DOCUMENTS

CN      208781246 U      4/2019
CN      110770750 A      2/2020

OTHER PUBLICATIONS

Extended European Search Report in Application No. 20158442.2, dated Aug. 25, 2020.

* cited by examiner

*Primary Examiner* — Lee Nguyen
(74) *Attorney, Agent, or Firm* — Syncoda LLC; Feng Ma (57) ABSTRACT

A supporting structure includes: a first supporting module located below the flexible screen and used for supporting the flexible screen, which has a first opening; and a second supporting module, which is located at a position corresponding to the first opening, when an external force acts through the flexible screen, the second supporting module forms a deformation protrusion towards a direction away from the flexible screen; and when the external force is removed, the deformation of the second supporting module is removed. Supporting the flexible screen corresponding to the first opening by the second supporting module can reduce a probability that the flexible screen collapses at the position of the first opening, thereby making appearance of the flexible screen flat.

16 Claims, 6 Drawing Sheets

SUPPORTING STRUCTURE FOR FLEXIBLE SCREEN, FLEXIBLE SCREEN STRUCTURE AND TERMINAL DEVICE

CROSS-REFERENCE TO RELATED APPLICATION

This application claims priority to Chinese Patent Application 201910673328.2 filed on Jul. 24, 2019, the disclosure of which is hereby incorporated by reference in its entirety.

BACKGROUND

With the gradual maturity of an in-screen fingerprint technology, more in-screen fingerprint features are incorporated into a terminal device such as a smart phone with a flexible display screen.

SUMMARY

The present disclosure generally relates to a technical field of electronic devices, and more particularly, to a supporting structure for a flexible screen, a flexible screen structure and a terminal device.

The present disclosure provides a supporting structure for a flexible screen, a flexible screen structure and a terminal device.

According to a first aspect of embodiments of the present disclosure, there is provided a supporting structure for a flexible screen, comprising:

a first supporting module located below the flexible screen and used for supporting the flexible screen, which has a first opening; and a second supporting module, located at a position corresponding to the first opening, which forms a deformation protrusion towards a direction facing away from the flexible screen when an external force acts through the flexible screen, and of which the deformation protrusion is removed when the external force is removed.

According to a second aspect of embodiments of the present disclosure, there is provided a flexible screen structure, comprising:

a flexible screen; and a supporting module, located below the flexible screen, which is the supporting structure for the flexible screen in one or more of the above-mentioned embodiments and used for supporting the flexible screen.

According to a third aspect of embodiments of the present disclosure, there is provided a terminal device, comprising:

a flexible screen structure, including the flexible screen structure in one or more of the above-mentioned embodiments; and a functional module located below the first opening of the flexible screen structure and used for executing a predetermined function by an external force conducted by the first opening of the flexible screen structure.

It is to be understood that both the foregoing general description and the following detailed description are exemplary and explanatory only and are not limiting of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Various embodiments of the present disclosure can address problems such as that when functional modules are added into a screen of the terminal device, it may cause an uneven appearance of the screen.

Figure 1:
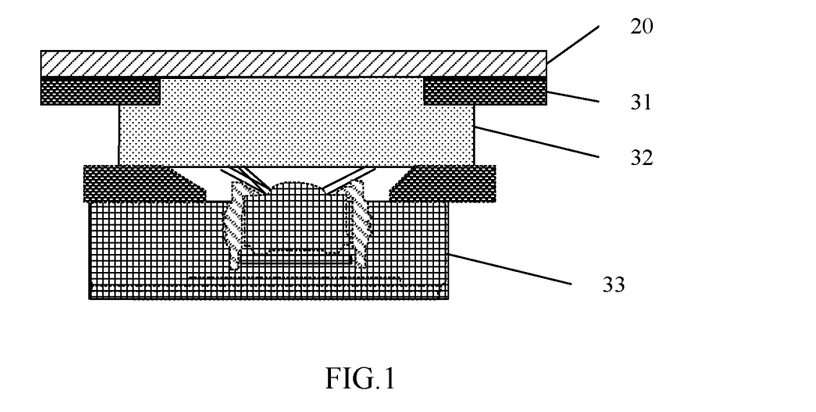
FIG. 1 is a first schematic diagram of a supporting structure for a flexible screen, according to an exemplary embodiment.

An embodiment of the present disclosure provides a supporting structure for a flexible screen. FIG. 1 is a supporting structure for a flexible screen according to an exemplary embodiment. As shown in FIG. 1, the supporting structure 30 for the flexible screen includes:

a first supporting module 31 located below the flexible screen 20 and used for supporting the flexible screen 20, wherein the first supporting module 31 has a first opening; and a second supporting module 32, located at a position corresponding to the first opening, wherein when an external force acts through the flexible screen 20, the second supporting module 32 forms a deformation protrusion towards a direction facing away from the flexible screen 20; and when the external force is removed, the deformation protrusion of the second supporting module 32 is removed.

In the embodiment of the present disclosure, the first supporting module 31 has a characteristic of bendability, can be bent according to design requirements, and can be widely applied to a terminal device with the flexible screen 20. The first supporting module 31 also has hardness, and can be used for supporting the flexible screen 20.

In some embodiments, the first supporting module 31 can be a module formed of a metal or alloy material, wherein the metal material includes steel.

In the embodiment of the present disclosure, the first supporting module 31 has a first opening, and an opening area of the first opening can be set according to a function which is to be executed by a functional module 33 corresponding to the first opening. For example, when the functional module 33 is a fingerprint acquiring module, the area of the first opening can be set according to a fingerprint acquiring range; and when the functional module 33 is a pressure sensing module, the area of the first opening can be set according to a sensing face of a pressure.

In addition, an opening shape of the first opening can be set according to user preferences. For example, the shape of the first opening can be set as a circle, an oval or a similar rectangle, and the embodiment of the present disclosure does not make any limit thereto.

In the embodiment of the present disclosure, the second supporting module 32 is located at a position corresponding to the first opening and used for supporting the flexible screen 20 at a position corresponding to the first opening.

It can be understood that the second supporting module 32 can be connected with the flexible screen 20 through the first opening to support the flexible screen 20, so that a probability that the flexible screen 20 collapses at the position of the first opening can be reduced, thereby making appearance of the flexible screen 20 flat.

In the embodiment of the present disclosure, the second supporting module 32 has a deformation recovery ability, and when the external force acts on the flexible screen 20 corresponding to the first opening, generates the deformation towards the direction facing away from the flexible screen 20 so as to form the protrusion; and when the external force is removed, the deformation of the second supporting module 32 is removed, and the second supporting module 32 is recovered into a state before the deformation.

In some embodiments, a case that the external face is acted on the flexible screen corresponding to the first opening includes, but is not limited to, a case that a finger of a user acts on the flexible screen corresponding to the first opening; or, the external force acts on the flexible screen corresponding to the first opening by an object, such as a stylus and the like.

It can be understood that according to the embodiment of the present disclosure, when the deformation of the second supporting module 32 is removed, the supporting structure can be recovered to the state before deformation to continuously support the flexible screen 20, so that when acting on the flexible screen 20, the user cannot obviously sense a touch change caused by the deformation, thereby improving user experience.

In some embodiments, as shown in FIG. 1, the second supporting module 32 is located at the position corresponding to the first opening, and when the external force acts through the flexible screen 20, the second supporting module 32 forms the deformation protrusion towards the direction facing away from the flexible screen 20, wherein the formed deformation protrusion is acted on the functional module 33 located below the second supporting module 32 so as to trigger the functional module 33 to execute a predetermined function.

In the embodiments of the present disclosure, when the external force acts on the first supporting module 31 through the flexible screen 20, the first supporting module 31 forms the deformation protrusion, and at the moment, the functional module 33 below the second supporting module 32 can be triggered to execute the predetermined function on the basis of the deformation.

It should be noted that the functional module 33 includes, but is not limited to, the fingerprint acquiring module or the pressure sensing module.

In some embodiments, when the functional module 33 is the fingerprint acquiring module and the second supporting module 32 is a transparent module, on the basis that the external force acts on the second supporting module 32 through the flexible screen, the second supporting module 32 forms the deformation protrusion, such that the functional module 33 can carry out fingerprint image acquisition through reflected light generated by the flexible screen 20.

When the functional module 33 is the pressure sensing module, on the basis that the external force acts on the second supporting module 32 through the flexible screen, the second supporting module 32 forms the deformation protrusion, such that the functional module 33 can determine a current state of the flexible screen by detecting a pressure applied to the flexible screen by the external force. For example, when it is detected that the pressure exceeds a predetermined threshold, it can be determined that the flexible screen is strongly pressed, and at the moment, the functional module 33 can output a prompt message so as to prompt that the external force acting on the flexible screen is excessively large.

In some embodiments, the second supporting module 32 is the transparent module.

In the embodiment of the present disclosure, the transparent module has transmittance and can enable the reflected light generated by the flexible screen to transmit. When the functional module 33 is the fingerprint acquiring module, the reflected light facing the functional module 33 can be generated through acting on the flexible screen 20 corresponding to the first opening by the user; and the second supporting module 32 enables the reflected light to transmit, so that the fingerprint acquiring module can carry out fingerprint image acquisition on the basis of the reflected light.

It should be noted that the supporting module usually does not have the characteristic of transmittance. In the process of implementing acquisition of an optical fingerprint in the flexible screen, an opening is needed in the fingerprint acquiring region corresponding to the supporting module needs to be opened, so that the fingerprint acquiring module below the supporting module can implement the acquisition of the optical fingerprint through the opening.

Figure 2:
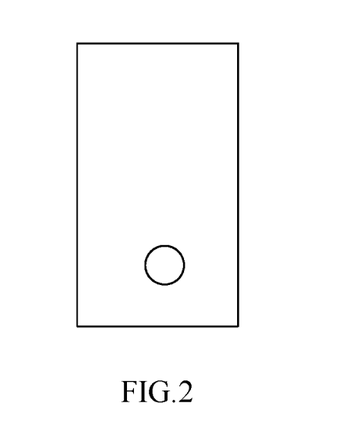
FIG. 2 is a schematic diagram of a first supporting module, according to an exemplary embodiment.

As shown in FIG. 2, a first opening is disposed in the fingerprint acquiring region of the supporting module, and the reflected light transmitting the flexible screen can implement the fingerprint acquisition below the flexible screen through the first opening.

It could be understood that the second supporting module 32 is a transparent module, which not only can support the flexible screen 20 corresponding to the first opening so as to reduce the probability that the flexible screen collapses at the position of the first opening, but also can achieve a function of acquiring the optical fingerprint below the flexible screen 20 on the basis of the reflected light transmitting the flexible screen 20.

Figure 3:
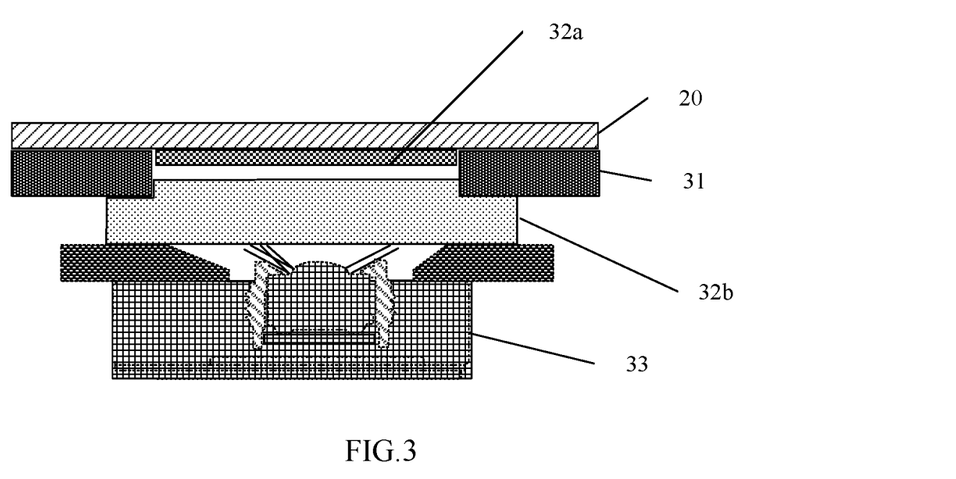
FIG. 3 is a second schematic diagram of a supporting structure for a flexible screen, according to an exemplary embodiment.

In some embodiments, as shown in FIG. 3, the second supporting module 32 includes:

an elastic component 32a, used for supporting the flexible screen 20 corresponding to the first opening, wherein when an external force acts through the flexible screen 20, a deformation protrusion is formed towards the direction facing away from the flexible screen 20; and when the external force is removed, the deformation of the elastic component 32a is removed; and a limiting component 32b, located at a position corresponding to the first opening, disposed at an interval with the elastic component 32a to form a gap, and when a length of the protrusion of the elastic component 32a reaches a width of the gap, limiting the elastic component 32a to be continuously deformed towards the direction facing away from the flexible screen 20.

In the embodiment of the present disclosure, the elastic component 32a has hardness, and can be used for supporting the flexible screen of a soft material. Additionally, the elastic component is located below the flexible screen, so that the flexible screen can be supported and then the surface of the flexible screen is flat.

It should be noted that when the external force acts on the elastic component, the elastic component is deformed and forms the protrusion towards the direction facing away from the flexible screen; and when the external force is removed, the deformation of the elastic component is removed.

It could be understood that the elastic component 32a not only can be used for supporting the flexible screen 20 to make the flexible screen 20 in a flat state, but also can be timely recovered from deformation, so that the user does not obviously perceive the touch change caused by the deformation when acting on the flexible screen 20, thereby improving user experience.

In some embodiments, the elastic component 32a can be a component formed of transparent plastic.

In some embodiments, the elastic component 32a can be a component formed of a Polyethylene terephthalate (PET) material.

In the embodiment of the present disclosure, the limiting component 32b and the elastic component 32b are disposed at an interval to form the gap.

It should be noted that the width of the gap can be set according to a pressure that the second supporting module 32 can bear, and also can be set according to a signal-to-noise ratio of fingerprint acquisition, and the embodiments of the present disclosure do not make any limit thereto.

In the embodiment of the present disclosure, when the length of the protrusion of the elastic component 32a reaches the width of the gap, the limiting component 32b limits the elastic component 32a to be continuously deformed towards the direction facing away from the flexible screen. It can be understood that when the length of the protrusion of the elastic component 32a reaches the width of the gap, i.e., the external force exceeding a predetermined range acts on the flexible screen, the limiting component 32b limits the elastic component 32a to be continuously deformed, so that the functional module 33 below the limiting component 32b can be protected and a probability that the functional component 33 is damaged is reduced.

In some embodiments, the limiting component 32b can be a component formed of a glass material or the PET material.

In some embodiments, the second supporting module 32 further includes:

a buffering component 32c, located between the elastic component 32a and the limiting component 32b, disposed at an interval with the elastic component 32a to form a gap, and deformed when the length of the deformation protrusion reaches a width of the gap, so as to buffer the deformation protrusion of the elastic component 32a towards the limiting component 32b.

It can be understood that the buffering component 32c in combination with the elastic component 32a and the limiting component 32b can further protect the functional module 33 below the limiting component 32b, and reduce the probability that the functional module 33 is damaged.

In some embodiments, the buffering component 32c can be a component formed of the transparent plastic.

In some embodiments, the buffering component 32c can be a component formed of the PET material.

Figure 4:
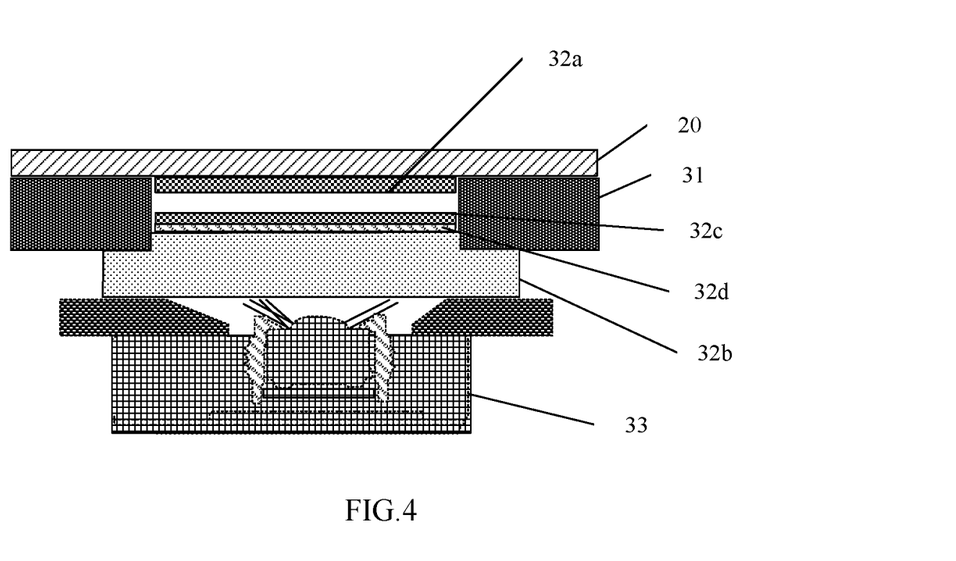
FIG. 4 is a third schematic diagram of a supporting structure for a flexible screen, according to an exemplary embodiment.

In some embodiments, as shown in FIG. 4, the second supporting module 30 further includes:

a first bonding component 32d, located between the buffering component 32c and the limiting component 32b and used for bonding the buffering component 32c to the limiting component 32b.

In some embodiments, the first bonding component 32d can be a component formed of a transparent adhesive.

In some embodiments, the first bonding component 32d can be a component formed of an Optically Clear Adhesive (OCA).

Figure 5:
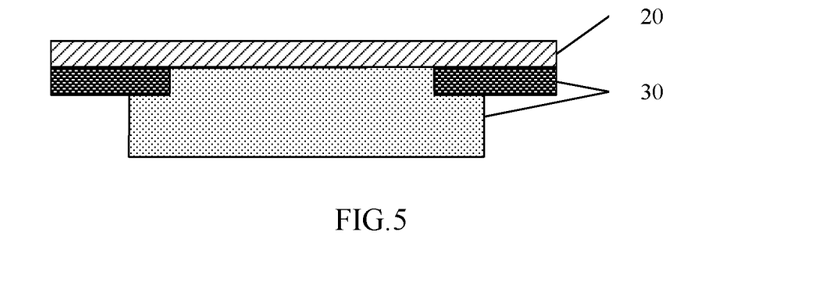
FIG. 5 is a first schematic diagram of a flexible screen structure, according to an exemplary embodiment.

An embodiment of the present disclosure further discloses a flexible screen structure. FIG. 5 is a schematic diagram of a flexible screen structure according to an exemplary embodiment. As shown in FIG. 5, the flexible screen structure includes:

a flexible screen 20; and a supporting module 30 located below the flexible screen, which is the supporting structure for the flexible screen in the above-mentioned embodiments and used for supporting the flexible screen.

In the embodiments of the present disclosure, the flexible screen is used for displaying information. The flexible screen has the characteristic of bendability, and can be applied to a foldable terminal device, or applied to a terminal device with a curved display function.

It should be noted that a screen component needs to be bent in the assembling process of the mobile device, such as a foldable screen or a curved flexible screen of a mobile phone. In order to completely release a screen stress when bending, the flexible screen structure is assembled in a layered attaching mode.

Figure 6:
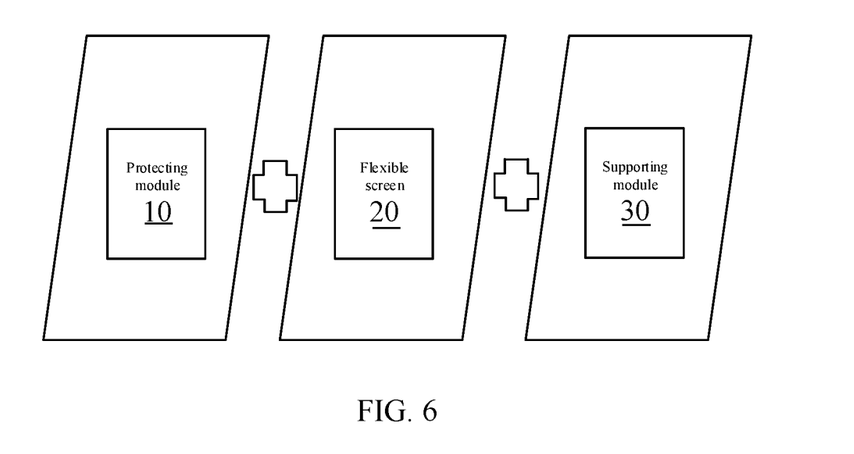
FIG. 6 is a first schematic diagram of a flexible screen structure, according to an exemplary embodiment.
Figure 7:
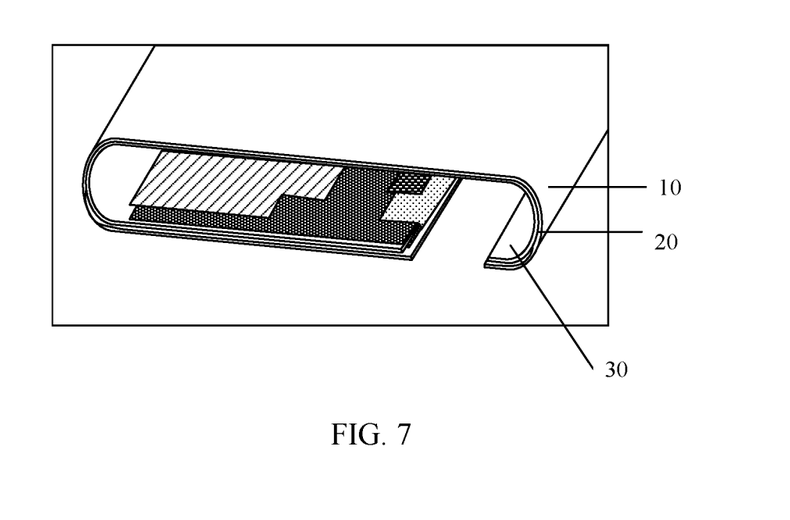
FIG. 7 is a second schematic diagram of a flexible screen structure, according to an exemplary embodiment.

As shown in FIG. 6, the flexible screen structure further includes a protecting module 10; and the protecting module 10 can be used for protecting the flexible screen from being damaged. As shown in FIG. 7, the flexible screen structure is in a bent form. In the process of layered assembling of the flexible screen structure, the flexible screen 20 is located between the protecting module 10 and the supporting module 30, the protecting module 10 is attached to the flexible screen 20, and the flexible screen 20 is attached to the supporting module 30.

In the embodiments of the present disclosure, the supporting module can be attached below the flexible screen 20.

In some embodiments, the flexible screen structure further includes:

a second bonding module 40 located between the elastic component 32a in the supporting module and the flexible screen 20 and used for bonding the elastic component 32a below the flexible screen 20; and a third bonding module 50, having a second opening being aligned with the first opening of the first supporting module 31, which is used for bonding the first supporting module 31 in the supporting module 30 below the flexible screen 20, or bonding the first supporting module 31 to the elastic component 32a, wherein the elastic component 32a is located at the second opening; the limiting component 32b in the supporting module is located at the first opening; and the gap between the elastic component 32a and the limiting component 32b is within a first distance range.

In the embodiments of the present disclosure, the second bonding module 40 bonds the elastic component 32a below the flexible screen 20.

In some embodiments, the second bonding module 40 can be a component formed of the transparent adhesive.

In some embodiments, the second bonding module 40 is a component formed of the OCA.

In the embodiment of the present disclosure, the third bonding module 50 has the second opening, and the second opening is aligned with the first opening.

It should be noted that a cross-sectional width of the second opening is greater than or equal to that of the first opening. A shape of the second opening can be set according to a shape of the first opening. For example, when the shape of the first opening is set as a circle, the shape of the second opening can also be a circle.

In some embodiments, when both the first opening and the second opening are a circle and a thickness of the flexible screen is 570 micrometers, it can be set that a diameter of the second opening is 9.4 millimeters, a diameter of the first opening is 8.4 millimeters and a diameter of the acquiring range of the functional module 33 below the first opening is 8.1 millimeters.

In the embodiment of the present disclosure, the third bonding module 50 is used for bonding the first supporting module 31 with other modules. The first supporting module 31 can be bonded to the flexible screen 20, or bonded to the elastic component 32a.

In some embodiments, the third bonding module 50 includes, but is not limited to, a module formed of foam glue.

In the embodiment of the present disclosure, the gap between the elastic component 32a and the limiting component 32b needs to be within the first distance range.

It should be noted that when the functional module 33 is the fingerprint acquiring module, the gap between the elastic component 32a and the limiting component 32b can be set according to the signal-to-noise ratio of fingerprint acquisition.

In some embodiments, the gap between the elastic component 32a and the limiting component 32b can be set between 150 micrometers and 200 micrometers.

It could be understood that when the gap between the elastic component 32a and the limiting component 32b is set between 150 micrometers and 200 micrometers, the signal-to-noise ratio of fingerprint acquisition can be made higher, so that an accurate fingerprint image can be obtained.

Figure 8:
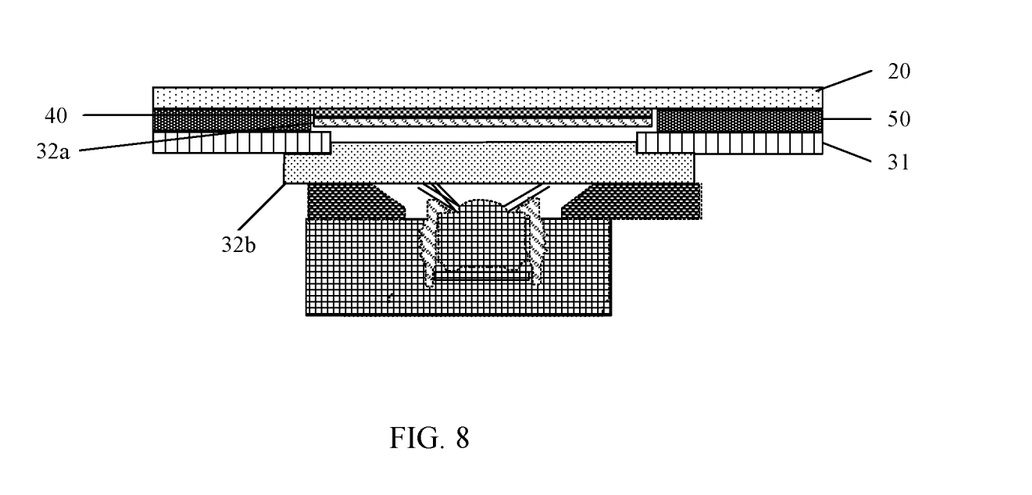
FIG. 8 is a second schematic diagram of a flexible screen structure, according to an exemplary embodiment.

In some embodiments, as shown in FIG. 8, when the first supporting module 31 is bonded to the flexible screen 20, the elastic component 32a and the second bonding module 40 are located in the second opening, and the first supporting module 31 is bonded to the flexible screen 20 by the second bonding module 40, wherein the gap is enabled to be within the first distance range by adjusting the thickness of the third bonding module 50 and the position of the limiting component 32b at the first opening.

In some embodiments, it is assumed that both a thickness of the second bonding module 40 and a thickness of the elastic component 32a are 50 micrometers, a thickness of the first supporting module 31 is 200 micrometers and the first distance range is from 150 micrometers to 200 micrometers. In order to enable the gap between the elastic component 32a and the limiting component 32b to be within the first distance range, and for example, enable the gap to be 200 micrometers, the thickness of the third bonding module 50 and the position of the limiting component 32b at the first opening can be adjusted, so that a distance between a surface of the limiting component 32b, which faces the flexible screen, and a surface of the first supporting module 31, which faces the flexible screen 20, is 100 micrometers, and the thickness of the third bonding module 50 is 200 micrometers.

Figure 9:
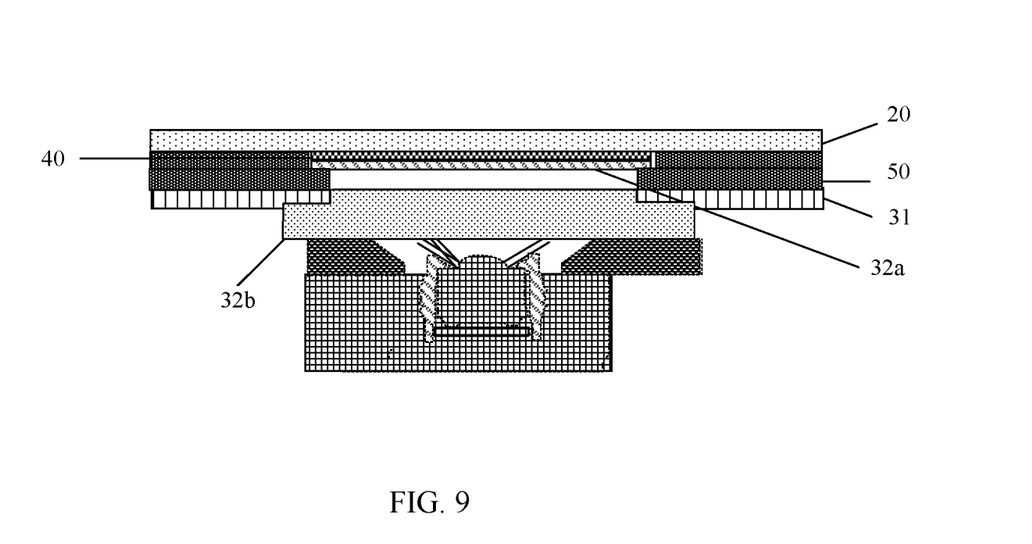
FIG. 9 is a third schematic diagram of a flexible screen structure, according to an exemplary embodiment.

In some embodiments, as shown in FIG. 9, the second opening is a step-shaped opening, and the step-shaped opening has a first sub-opening and a second sub-opening, wherein the first sub-opening is disposed on one side of the flexible screen 20, which faces the limiting component 32b, the second sub-opening is disposed on one side of the limiting component 32b, which faces the flexible screen 20, the first sub-opening is connected with the second sub-opening, and a cross-sectional width of the first sub-opening is greater than that of the second sub-opening; and the elastic component 32a and the second bonding module 40 are located in the first sub-opening.

In some embodiments, on the basis of FIG. 8, the second opening is the step-shaped opening, and it is assumed that a thickness of the first sub-opening is 100 micrometers, and both the thickness of the second bonding module 40 and the thickness of the elastic component 32a are 50 micrometers. In order to enable the gap between the elastic component 32a and the limiting component 32b to be within the first distance range, for example, a gap of 150 micrometers, a thickness of the second sub-opening and the position of the limiting component 32b at the first opening can be adjusted, so that the distance between the surface of the limiting component 32b, which faces the flexible screen, and the surface of the first supporting module 31, which faces the flexible screen, is 50 micrometers, and the thickness of the second sub-opening is 100 micrometers.

Figure 10:
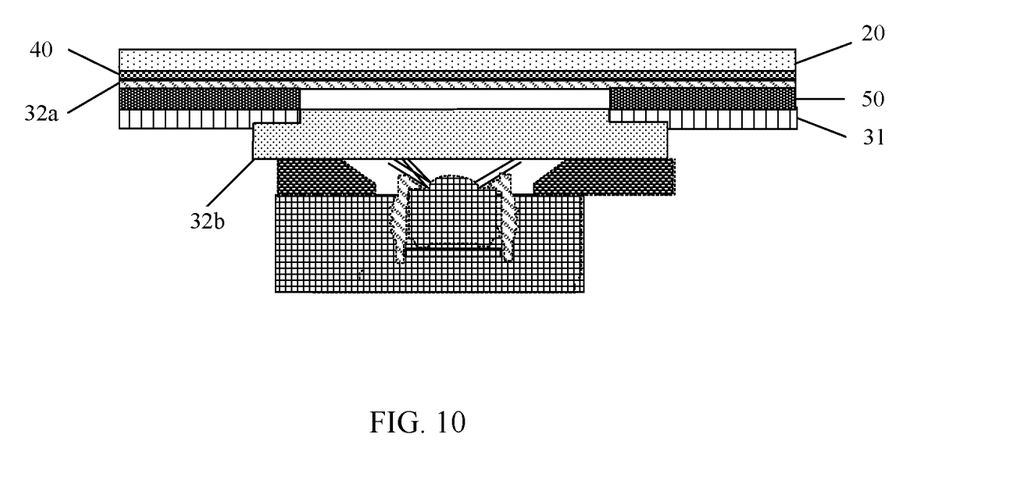
FIG. 10 is a fourth schematic diagram of a flexible screen structure, according to an exemplary embodiment.

In some embodiments, as shown in FIG. 10, when the first supporting module 31 is bonded to the elastic component 32a, the elastic component 32a is located between the third bonding module 50 and the second bonding module 40, wherein the gap is enabled to be within the first distance range by adjusting the thickness of the third bonding module 50.

In some embodiments, it is assumed that both the thickness of the second bonding module 40 and the thickness of the elastic component 32a are 50 micrometers, the thickness of the first supporting module 31 is 200 micrometers, and the first distance range is 150 micrometers to 200 micrometers. In order to enable the gap between the elastic component 32a and the limiting component 32b to be within the first distance range, for example, a gap of 150 micrometers, the thickness of the third bonding module 50 can be 150 micrometers.

Figure 11:
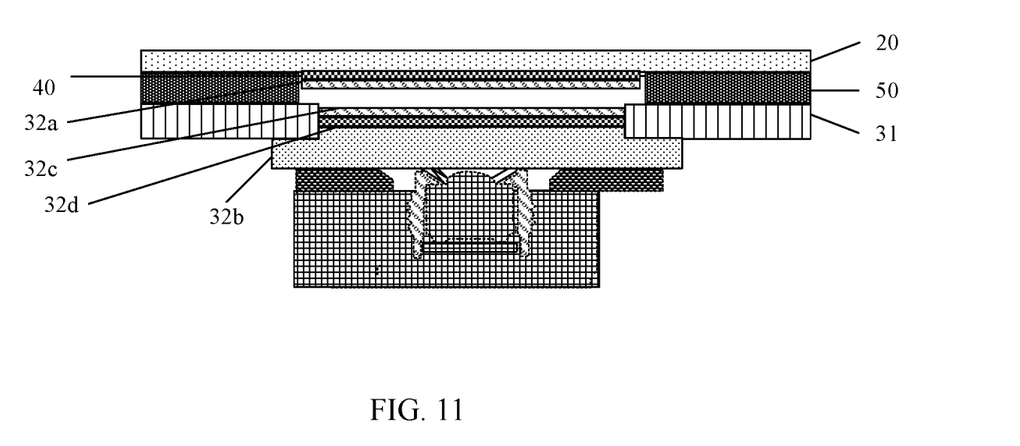
FIG. 11 is a fifth schematic diagram of a flexible screen structure, according to an exemplary embodiment.

In some embodiments, as shown in FIG. 11, the buffering component 32c in the supporting module is bonded to the limiting component 32b by the first bonding component 32d, wherein the gap between the buffering component 32c and the elastic component 32a is within the first distance range by adjusting the thicknesses of the buffering component 32c and the first bonding component 32d and the thickness of the third bonding module 50.

It should be noted that the buffering component 32c and the first bonding component 32d can be disposed in the first opening of the first supporting module 31 after being attached, or can be separately disposed in the first opening of the first supporting module 31.

In some embodiments, it is assumed that both the thickness of the second bonding module 40 and the thickness of the elastic component 32a are 50 micrometers, the thickness of the first supporting module 31 is 200 micrometers and the first distance range is 150 micrometers to 200 micrometers. In order to enable the gap between the elastic component 32a and the limiting component 32b to be within the first distance range, the thickness of the third bonding module 50 and a sum of the thicknesses of the buffering component 32c and the first bonding component 32d can be adjusted, so that the sum of the thicknesses is smaller than the thickness of the first supporting module 31, and the thickness of the third bonding module 50 is 200 micrometers.

An embodiment of the present disclosure further discloses a terminal device. The terminal device includes:

a flexible screen structure, such as the flexible screen structure in the above-mentioned embodiments; and a functional module 33 located below the first opening of the flexible screen structure and used for executing a predetermined function by an external force conducted by the first opening of the flexible screen structure.

In the embodiment of the present disclosure, the terminal device can include, but be not limited to, a mobile device or a wearable device, wherein the mobile device includes a smart phone, a tablet computer and an e-book reader; and the wearable device includes a smart watch.

It could be understood that the terminal device can be a terminal device with the flexible screen structure, so that optical fingerprint acquisition below the flexible screen can be implemented and the probability that the flexible screen collapses at the position of the first opening also can be reduced, thereby making appearance of the flexible screen flat.

In some embodiments, the functional module 33 includes a fingerprint acquiring module, and the fingerprint acquiring module is used for acquiring a fingerprint.

It could be understood that the fingerprint acquiring module is disposed below the first opening of the flexible screen structure, and the flexible screen structure can transmit the reflected light generated when the user acts on the flexible screen to the fingerprint acquiring module, so that the fingerprint acquiring module can carry out acquisition of a fingerprint image on the basis of the reflected light, thereby implementing acquisition of an optical fingerprint below the flexible screen.

Various embodiments of the present disclosure can have one or more of the following advantages. The supporting of the flexible screen corresponding to the first opening by the second supporting module can reduce a probability that the flexible screen collapses at the position of the first opening, thereby making appearance of the flexible screen flat; and supporting the flexible screen corresponding to the first opening by the second supporting module can enable a user not to obviously sense a touch change caused by the first opening when acting on the flexible screen, thereby improving user experience.

It should be noted that words such as "first", "second" and "third" in the embodiments of the present disclosure are only used for facilitating description and differentiation, and have no other specific denotations.

Figure 12:
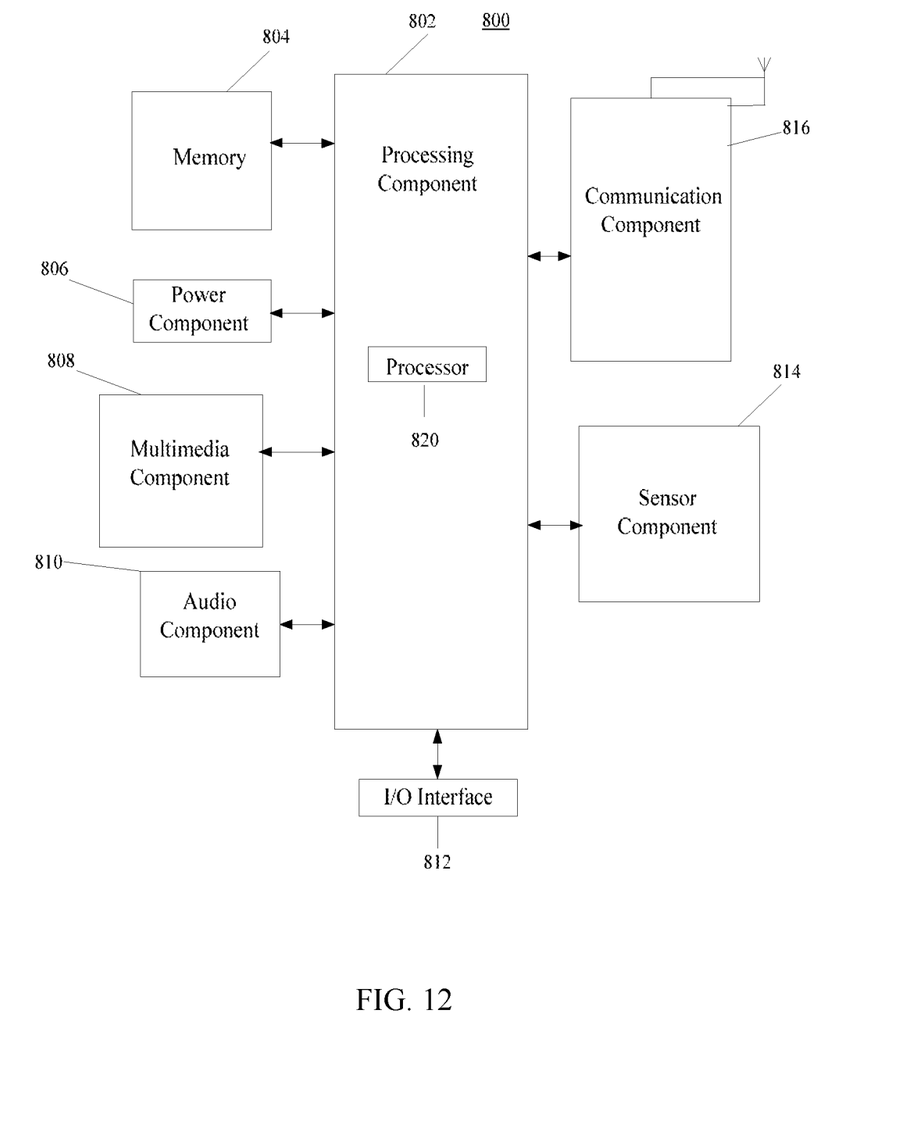
FIG. 12 is a structural schematic diagram of a terminal device, according to an exemplary embodiment.

FIG. 12 is a bock diagram of a terminal device 800, according to an exemplary embodiment. For example, the terminal device 800 may be a mobile phone, a computer, a digital broadcast terminal, a messaging device, a gaming console, a tablet, a medical device, fitness equipment, a personal digital assistant, and the like.

Referring to FIG. 12, the terminal device 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 can include one or more processors 820 to execute instructions. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the terminal device 800. Examples of such data include instructions for any applications operated on the terminal device 800, contact data, phonebook data, messages, pictures, video, etc. The memory 804 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or optical disk.

The power component 806 provides power to various components of the terminal device 800. The power component 806 can include a power management system, one or more power sources, and any other components associated with the generation, management, and distribution of power in the terminal device 800.

The multimedia component 808 includes a screen providing an output interface between the terminal device 800 and the user. In some embodiments, the screen can include a liquid crystal display (LCD) and a touch panel (TP). In some embodiments, the display screen can be an organic light-emitting diode (OLED) display screen, or other types of screens.

If the screen includes the touch panel, the screen can be implemented as a touch screen to receive input signals from the user. The touch panel includes one or more touch sensors to sense touches, slides, and gestures on the touch panel. The touch sensors can not only sense a boundary of a touch or sliding action, but also sense a period of time and a pressure associated with the touch or slide action. In some embodiments, the multimedia component 808 includes a front camera and/or a rear camera. The front camera and/or the rear camera can receive an external multimedia datum while the terminal device 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the terminal device 800. For instance, the sensor component 814 can detect an open/closed status of the terminal device 800, relative positioning of components, e.g., the display and the keypad, of the terminal device 800, and the sensor component 814 can also detect a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication, between the terminal device 800 and other devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In exemplary embodiments, there is also provided a non-transitory computer readable storage medium including instructions, such as a memory 804 including instructions executable by the processor 820 in the terminal device 800. For example, the non-transitory computer-readable storage medium can be a ROM, a RAM, a CD-ROM, a magnetic tape, a floppy disc, an optical data storage device, and the like.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A supporting structure for a flexible screen, comprising:
a first supporting module located below the flexible screen and configured to support the flexible screen, wherein the first supporting module has a first opening; and
a second supporting module located at a position corresponding to the first opening, and configured to form a deformation protrusion in a direction away from the flexible screen upon an external force acts on the flexible screen;
wherein the deformation protrusion is configured to disappear upon the external force being removed; and
wherein the second supporting module comprises:
an elastic component used for supporting the flexible screen corresponding to the first opening, which forms a deformation protrusion towards a direction facing away from the flexible screen when an external force acts through the flexible screen, and of which the deformation protrusion is removed when the external force is removed;
a limiting component located at a position corresponding to the first opening, and disposed at an interval with the elastic component to form a gap, which limits the elastic component to be continuously deformed towards the direction facing away from the flexible screen when a length of the protrusion of the elastic component reaches a width of the gap; and
a buffering component, located between the elastic component and the limiting component, and disposed at an interval with the elastic component to form the gap, which is deformed when the length of the deformation protrusion reaches the width of the gap, so as to buffer the deformation protrusion of the elastic component towards the limiting component.

2. The supporting structure of claim 1, wherein the second supporting module is a transparent module.

3. The supporting structure of claim 1, wherein the second supporting module further comprises:
a first bonding component, located between the buffering component and the limiting component and used for bonding the buffering component to the limiting component.

4. A mobile phone comprising the supporting structure of claim 1, and the flexible screen, wherein the flexible screen is a liquid-crystal display (LCD) screen or an organic light-emitting diode (OLED) display screen.

5. The mobile phone of claim 4, wherein the second supporting module is configured to support of the flexible screen corresponding to the first opening to thereby reduce a probability that the flexible screen collapses at the position of the first opening.

6. The mobile phone of claim 5, wherein the second supporting module is configured to support the flexible screen corresponding to the first opening such that a user does not obviously sense a touch change caused by the first opening when acting on the flexible screen.

7. The mobile phone of claim 6, wherein the first supporting module is composed of metal.

8. The mobile phone of claim 7, wherein the second supporting module is composed of transparent plastic.

9. A flexible screen structure, comprising:
a flexible screen; and
a supporting module located below the flexible screen, wherein the supporting module comprises:
a first supporting module located below the flexible screen and used for supporting the flexible screen, which has a first opening; and
a second supporting module located at a position corresponding to the first opening, which forms a deformation protrusion towards a direction facing away from the flexible screen when an external force acts through the flexible screen, and of which the deformation protrusion is removed when the external force is removed;
wherein the second supporting module comprises:
an elastic component used for supporting the flexible screen corresponding to the first opening, which forms a deformation protrusion towards a direction facing away from the flexible screen when an external force acts through the flexible screen, and of which the deformation protrusion is removed when the external force is removed;
a limiting component located at a position corresponding to the first opening, and disposed at an interval with the elastic component to form a gap, which limits the elastic component to be continuously deformed towards the direction facing away from the flexible screen when a length of the protrusion of the elastic component reaches a width of the gap; and
a buffering component, located between the elastic component and the limiting component, and disposed at an interval with the elastic component to form the gap, which is deformed when the length of the deformation protrusion reaches the width of the gap, so as to buffer the deformation protrusion of the elastic component towards the limiting component.

10. The flexible screen structure of claim 9, wherein the second supporting module is a transparent module.

11. The flexible screen structure of claim 9, wherein the second supporting module further comprises:
- a first bonding component, located between the buffering component and the limiting component and used for bonding the buffering component to the limiting component.

12. The flexible screen structure of claim 9, further comprising:
- a second bonding module, located between the elastic component in the supporting module and the flexible screen and used for bonding the elastic component below the flexible screen; and
- a third bonding module, having a second opening being aligned with the first opening of the first supporting module, which is used for bonding the first supporting module in the supporting module below the flexible screen, or bonding the first supporting module to the elastic component,
- wherein the elastic component is located at the second opening; the limiting component in the supporting module is located at the first opening; and the gap between the elastic component and the limiting component is within a first distance range.

13. The flexible screen structure of claim 12, wherein when the first supporting module is bonded with the flexible screen, the elastic component and the second bonding module are located in the second opening, and the first supporting module is bonded with the flexible screen by the second bonding module, wherein the gap is enabled to be within the first distance range by adjusting a thickness of the third bonding module and the position of the limiting component at the first opening.

14. The flexible screen structure of claim 13, wherein the second opening is a step-shaped opening which has a first sub-opening and a second sub-opening, wherein the first sub-opening is disposed on one side of the flexible screen facing the limiting component, the second sub-opening is disposed on one side of the limiting component facing the flexible screen, the first sub-opening is connected with the second sub-opening, and a cross-sectional width of the first sub-opening is greater than that of the second sub-opening; and
- the elastic component and the second bonding module are located in the first sub-opening.

15. The flexible screen structure of claim 12, wherein when the first supporting module is bonded with the elastic component, the elastic component is located between the third bonding module and the second bonding module, wherein the gap is enabled to be within the first distance range by adjusting a thickness of the third bonding module.

16. A terminal device, comprising:
- the flexible screen structure of claim 9; and
- a functional module located below the first opening of the flexible screen structure and used for executing a predetermined function by an external force conducted by the first opening of the flexible screen structure.

* * * * *